(12) United States Patent  
Demoor et al.

(10) Patent No.: US 12,099,754 B2  
(45) Date of Patent: Sep. 24, 2024

(54) SYSTEM AND METHOD FOR STORING AND RETRIEVING OBJECTS ACROSS MULTIPLE MEDIA

(71) Applicant: QUANTUM CORPORATION, San Jose, CA (US)

(72) Inventors: Thomas Demoor, De Haan (BE); Stijn Blyweert, Calgary (CA); Frederik De Schrijver, Diksmuide (BE); Don Doerner, San Jose, CA (US); Mary Hayes, San Jose, CA (US); Turguy Goker, Oceanside, CA (US)

(73) Assignee: Quantum Corporation, San Jose, CA (US)

( * ) Notice: Subject to any disclaimer, the term of this patent is extended or adjusted under 35 U.S.C. 154(b) by 40 days.

(21) Appl. No.: 17/960,561

(22) Filed: Oct. 5, 2022

(65) Prior Publication Data

US 2023/0103497 A1    Apr. 6, 2023

Related U.S. Application Data

(60) Provisional application No. 63/252,945, filed on Oct. 6, 2021.

(51) Int. Cl.  
*G06F 3/06* (2006.01)  
*G06F 11/10* (2006.01)

(52) U.S. Cl.  
CPC .......... *G06F 3/0685* (2013.01); *G06F 3/0604* (2013.01); *G06F 3/0631* (2013.01); *G06F 3/0682* (2013.01); *G06F 11/10* (2013.01)

(58) Field of Classification Search  
CPC .... G06F 3/0685; G06F 3/0604; G06F 3/0631; G06F 11/10; G06F 3/0682  
(Continued)

(56) References Cited

U.S. PATENT DOCUMENTS

| | | | |
|---|---|---|---|
| 7,552,358 B1 * | 6/2009 | Asgar-Deen | G06F 11/1435 714/15 |
| 2013/0148227 A1 * | 6/2013 | Tofano | G06F 3/0682 |

(Continued)

*Primary Examiner* — Than Nguyen  
(74) *Attorney, Agent, or Firm* — James P. Broder; Roeder & Broder LLP

(57) ABSTRACT

A method for utilizing an object storage system (470) for storing and retrieving a volume of data, the volume of data including a plurality of data objects, the method includes the steps of accumulating the volume of data to an ingest area (474) provided within a non-taped-based storage medium; copying a first subset of the plurality of data objects to a first tape medium (472A); and copying a second subset of the plurality of data objects to a second tape medium (472B) that is independent of the first tape medium (472A). The method can further include managing the object storage system (470) with object storage software (476) to perform one or more of (i) generating a first extent parity that contains redundant information from the first subset of the plurality of data objects using erasure coding; and writing the first extent parity to the first tape medium (472A); (ii) generating a second extent parity that contains redundant information from the second subset of the plurality of data objects using erasure coding; and writing the second extent parity to the second tape medium (472B); and (iii) generating a volume parity that contains redundant information from the volume of data using erasure coding; and writing the volume parity to a third tape medium (472C) that is independent of the first tape medium (472A) and the second tape medium (472B).

18 Claims, 5 Drawing Sheets

(58) Field of Classification Search
USPC .............................................................. 711/4
See application file for complete search history.

(56) References Cited

U.S. PATENT DOCUMENTS

| | | | |
|---|---|---|---|
| 2014/0025641 A1* | 1/2014 | Kumarasamy | G06F 16/2365 |
| | | | 707/661 |
| 2019/0310942 A1* | 10/2019 | Yamamoto | G11B 5/00817 |
| 2021/0037112 A1* | 2/2021 | Ankireddypalle | H04L 67/5683 |
| 2024/0028479 A1* | 1/2024 | Kumarasamy | G06F 11/1458 |

* cited by examiner

SYSTEM AND METHOD FOR STORING AND RETRIEVING OBJECTS ACROSS MULTIPLE MEDIA

RELATED APPLICATION

This application claims priority on U.S. Provisional Application Ser. No. 63/252,945 filed on Oct. 6, 2021 and entitled "SYSTEM AND METHOD FOR STORING AND RETRIEVING OBJECTS ACROSS MULTIPLE MEDIA". As far as permitted, the contents of U.S. Provisional Application Ser. No. 63/252,945 are incorporated in their entirety herein by reference.

BACKGROUND

Automated tape library systems (or "tape libraries") are commonly utilized for purposes of writing data to and reading data from magnetic tape cartridges. Magnetic tape cartridges are configured to retain and/or store magnetic tape that can be used in a magnetic tape drive for purposes of writing data to and reading data from the magnetic tape. Magnetic tape cartridges have been used extensively because they provide a convenient way to house and support a length of magnetic tape for engagement by a transducer (or tape head, sometimes simply referred to as a "head") in the tape drive while protecting the tape upon removal of the cartridge. Moreover, magnetic tape cartridges facilitate economic and compact storage of data, especially when such data is being stored over long periods of time such as for archival storage purposes. During use of the magnetic tape drive, a tape head of the magnetic tape drive is configured to be in direct contact with the magnetic tape from the magnetic tape cartridge so that data can be written to and read from the magnetic tape in a series of data tracks and/or data bands as the magnetic tape moves across the tape head at varying speed from low speed to high speed. Such tape heads can include dedicated write heads, dedicated read heads, or combination read/write heads.

Stored data in any type of data storage device may be protected against storage media failures or other loss by storing extra copies, by storing additional redundant information, or in other ways. One type of redundancy-based protection involves using erasure coding. Erasure coding uses additional redundant data to produce erasure codes (EC) that protect against so-called erasures. An erasure may be an error with a location that is known a priori. The erasure codes allow data portions that are lost to be reconstructed from the surviving data. The application of erasure codes to data storage have typically been for the purpose of recovering data in the face of failures of hardware elements storing the data. Tape cartridges using Dual Reed Solomon erasure coding can achieve a bit error rate (BER) significantly lower than hard disk drives (HDD). HDDs, for example, exhibit non-Gaussian error modes that dominate the mean time between failures (MTBF).

Tape drives, on the other hand, often encounter errors during reading, including off-track errors, media data errors, damaged tape, deteriorated tape, host drive speed mismatches, and other hardware and firmware problems. Conventional tape drives retry a read when an error is encountered. Retries result in repetitive repositioning, which combined with the high speeds of tape drives, leads to further deterioration and damage to the tape. The damage may include tape surface damage and air entrainment problems, which can, in turn, lead to even more errors. Conventional tape formats do not necessarily have optimal useful approaches to deal with hard read errors, other than retries with repositioning. Thus, if the data in the damaged section (such as a couple of millimeters (mms) by a couple of mms of magnetic tape) cannot be read, conventional tape systems give up, even though the rest of the data on the tape may be fine. Conventional systems therefore rely on tape backup copies to recover original data at the cost of overhead. However, the backup copies may also be subject to the same errors, which may result in multiple unusable tape cartridges within a data storage system.

Erasure codes are often used to increase data storage durability, but come with the cost of overhead. Moreover, the conventional deployment of erasure codes does not protect data from localized damage to tapes that is beyond the power of the systems internal to the tape system to correct. Conventional tape systems thus make multiple copies of cartridges, also known as replication, to achieve required levels of durability. For example, to achieve enterprise levels of durability, a conventional tape data storage system, even assuming errors were random, would require multiple copies of data. Unfortunately, critical tape errors are not uniformly random.

Internal error/erasure correction code/coding (ECC) systems as used in conventional linear tape open (LTO) systems cannot efficiently deal with many types of hard errors, including lost cartridges, cut tapes, lost pins, environment issues, loss of magnetic coating, shock and vibration, edge damage, debris and particles, magnetic coating wear, or staggered wraps. For example, if a conventional system loses a cartridge because a tape cartridge retrieval assembly, or robot, dropped the cartridge or someone stole it, the data is gone, regardless of the BER or the ECC system employed. To handle these kinds of hard errors and achieve eleven nines or more of durability, conventional systems utilize at least six copies, potentially residing at different sites, which is costly and provides a significant tape management challenge. In one representative example, if a file is distributed over four tapes to increase transfer rates, but still needs to be replicated six times to achieve the desired durability, the system would need 24 tapes, which is not an optimal solution. Availability issues for a tape cartridge may occur at the tape level (such as lost tape, damaged tape, etc.) or at a system level (such as tape library robot down, unavailable, etc.).

As noted, current solutions that protect data across multiple tape media typically either use a multi-copy strategy, or erasure encode on the individual object level, or only aggregate objects together for erasure coding that are "concurrently in flight". However, each of these enacted solutions suffer from certain drawbacks that make such solutions less than optimal.

Making multiple copies of the data is very inefficient. For example, to protect against two tape failures, one requires three copies, thus experiencing a 300% storage overhead.

On systems where each object is erasure coded individually, the object data is broken up into multiple parts which are stored on different tapes. Hence, reading the object back requires one to load multiple tapes into tape drives. For instance, when using a 3+1 erasure code, data is spread over three tapes. This is detrimental to the system/drive I/O efficiency, as the time to read from tape is dominated by the time it takes to deliver the tape to the drive, mount the tape and then position at the correct offset. This process typically takes over a minute, and only then actual data transfer and/or I/O happens, typically taking seconds (such as with LTO-8 at 350 MB/sec), before another minute of drive time is spent on rewind and unmount. Consequently, a strategy which needs to do three tape loads to read 3×10 MB, uses far more (drive & robot) resources than would otherwise be preferable.

Aggregating multiple objects together has been utilized as a method to alleviate the problem described above. The current state-of-the-art only aggregates requests that are concurrently "in flight". However, as clients expect a response within a few (hundred) milliseconds after writing the data, even a busy system typically has only a few thousands of requests in flight. This approach can aggregate data, but never enough data to always result in terabyte-sized tape writes.

Thus, it is desired to provide a system and method for storing and retrieving objects across multiple storage media, and libraries, in a manner that is more cost-efficient and resource-efficient than is possible in conventional systems. More particularly, it is desired to provide a system and method for storing a collection of objects across a set of media with tape-like characteristics in a manner that minimizes chance of data loss and maximizes read/write performance.

SUMMARY

The present invention is directed toward a method for utilizing an object storage system for storing and retrieving a volume of data, the volume of data including a plurality of data objects. In various embodiments, the method includes the steps of accumulating the volume of data to an ingest area provided within a non-taped-based storage medium; copying a first subset of the plurality of data objects to a first tape medium; and copying a second subset of the plurality of data objects to a second tape medium that is independent of the first tape medium.

In one embodiment, the ingest area is provided within a hard-disk drive-based storage medium. In another embodiment, the ingest area is provided within a solid-state drive-based storage medium. In still another embodiment, the ingest area is provided within a non-volatile memory express-based storage medium. In yet another embodiment, the ingest area is provided within a battery-backed random-access memory-based storage medium.

In certain embodiments, the method further includes the step of managing the object storage system with object storage software.

In some embodiments, the step of managing includes the steps of generating a first extent parity that contains redundant information from the first subset of the plurality of data objects using the object storage software; and writing the first extent parity to the first tape medium using the object storage software.

In one embodiment, the step of generating includes using erasure coding to generate the first extent parity.

In some embodiments, the step of managing further includes the steps of generating a second extent parity that contains redundant information from the second subset of the plurality of data objects using the object storage software; and writing the second extent parity to the second tape medium using the object storage software.

In one embodiment, the step of generating the second extent parity includes using erasure coding to generate the second extent parity.

In certain embodiments, the step of managing further includes the steps of generating a volume parity that contains redundant information from the volume of data using the object storage software; and writing the volume parity to a third tape medium that is independent of the first tape medium and the second tape medium using the object storage software.

In some embodiments, the method further includes the steps of retaining the first tape medium within a first tape library; retaining the second tape medium within a second tape library that is different than the first tape library; and retaining the third tape medium within a third tape library that is different than the first tape library and the second tape library.

In certain embodiments, the first tape library is positioned in a first geographical location; the second tape library is positioned in a second geographical location that is different than the first geographical location; and the third tape library is positioned in a third geographical location that is different than the first geographical location and the second geographical location.

In certain embodiments, the method further includes the step of copying a third subset of the plurality of data objects to a third tape medium that is independent of the first tape medium and the second tape medium.

In some embodiments, the method further includes the step of managing the object storage system with object storage software.

In certain embodiments, the step of managing includes the steps of generating a first extent parity that contains redundant information from the first subset of the plurality of data objects using the object storage software; writing the first extent parity to the first tape medium using the object storage software; generating a second extent parity that contains redundant information from the second subset of the plurality of data objects using the object storage software; writing the second extent parity to the second tape medium using the object storage software; generating a third extent parity that contains redundant information from the third subset of the plurality of data objects using the object storage software; and writing the third extent parity to the third tape medium using the object storage software.

In one embodiment, the step of generating includes using erasure coding to generate the first extent parity; the step of generating the second extent parity includes using erasure coding to generate the second extent parity; and the step of generating the third extent parity includes using erasure coding to generate the third extent parity.

In certain embodiments, the step of managing further includes the steps of generating a first volume parity that contains redundant information from the volume of data using the object storage software; writing the first volume parity to a fourth tape medium that is independent of the first tape medium, the second tape medium and the third tape medium using the object storage software.

In some embodiments, the step of managing further includes the steps of generating a second volume parity that contains redundant information from the volume of data using the object storage software; and writing the second volume parity to a fifth tape medium that is independent of the first tape medium, the second tape medium, the third tape medium and the fourth tape medium using the object storage software.

The present invention is further directed toward an object storage system for storing and retrieving a volume of data, the volume of data including a plurality of data objects, the object storage system including an ingest area configured for accumulating the volume of data, the ingest area being provided within a non-taped-based storage medium; a first tape medium that is configured such that a first subset of the plurality of data objects is copied to the first tape medium;

and a second tape medium that is configured such that a second subset of the plurality of data objects is copied to the second tape medium, the second tape medium being independent of the first tape medium.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
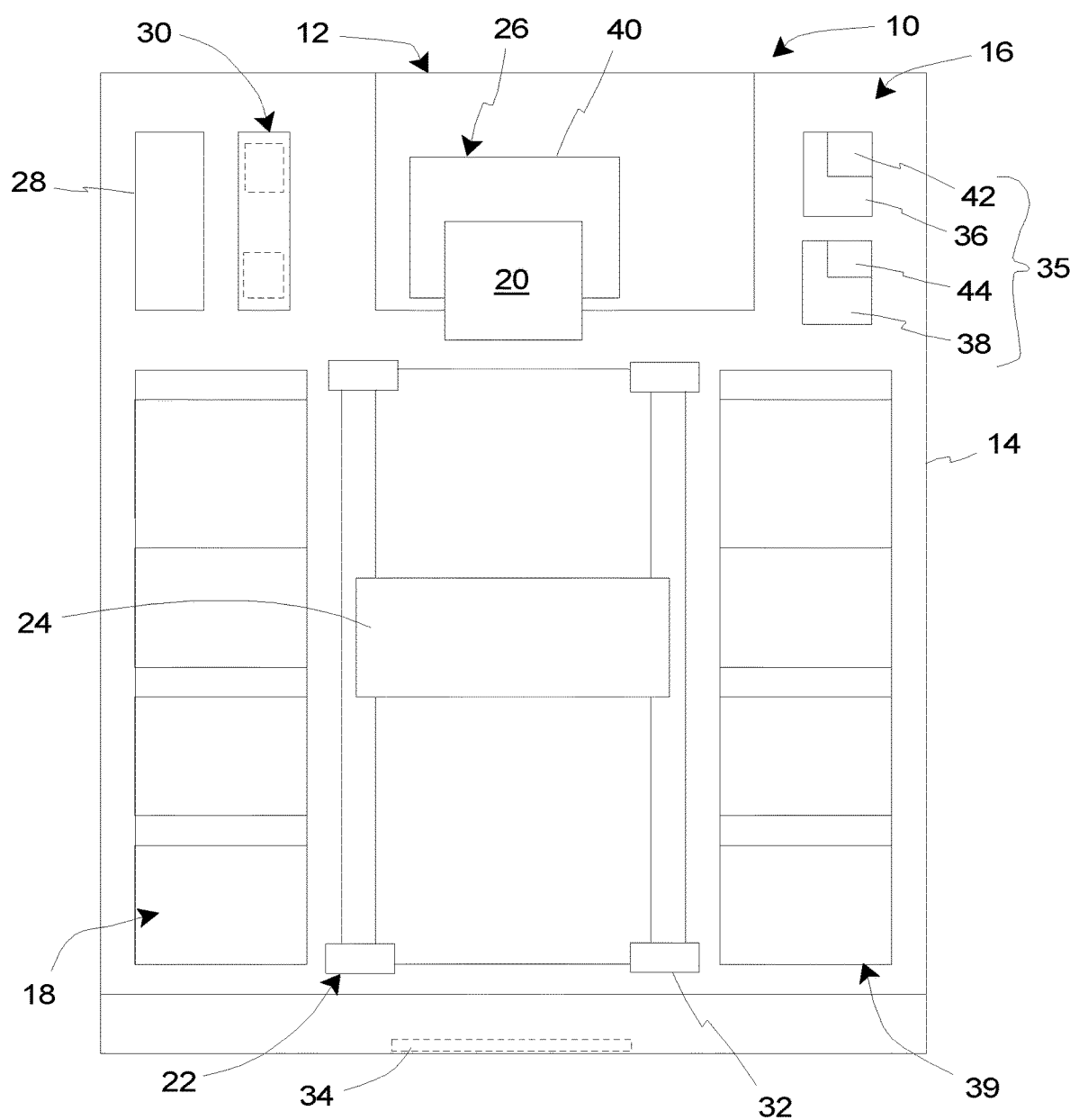
FIG. 1 is a simplified schematic top view illustration of an embodiment of an automated tape library system that can be utilized with the present invention.

Embodiments of the present invention are described herein in the context of an object storage system and method to efficiently store and retrieve a collection of objects across multiple storage devices, such as tape media or other suitable storage devices, and/or libraries, by using an ingest area (or staging area) and two-dimensional erasure coding. The present invention is also directed toward an object storage system and method for storing a collection of objects across a set of media with tape-like characteristics in a way that minimizes chance of data loss and maximizes read/write performance. In various implementations, the present invention further entails a fully integrated single object storage system that treats non-tape media, such as hard disk drives (HDD) or other suitable non-tape storage media, and tape media as individual storage devices, with both types of storage media being controlled via software incorporated within the single object storage system (as opposed to utilizing two separate object storage systems, one for each storage media type and with its own software, which interface with one another). In such integrated object storage system, the same data objects are stored with unique interleaving and encoding based on the storage devices selected. For instance, an object can be encoded and interleaved using a current AS (Active Scale) EC architecture, and when the same object is moved to tape within the same physical system it is re-encoded and de-interleaved based on the characteristics of the tape as the object is moved from HDD to tape or from tape back to HDD. In such implementations, metadata is a generalized combined metadata that manages the life of any object on HDD or tape or combined.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic top view illustration of an automated tape library system 10 (also sometimes referred to herein simply as a "tape library") that can be utilized with the present invention. The tape library 10 includes a tape drive system 12 that includes one or more tape drives 26 that are usable for writing data to and reading data from magnetic tape 250 (illustrated in FIG. 2, and sometimes referred to as "tape medium") that is retained within a tape cartridge 20. In FIG. 1, a top cover (not shown) has been omitted for clarity so that the interior of the tape library 10 is visible. The design of the tape library 10 can be varied as desired. In particular, the tape library 10 can have any suitable design that is capable of storing a plurality of tape cartridges 20 and using one or more tape drives 26 to write data to and read data from the plurality of tape cartridges 20. More specifically, it is noted that the tape library 10 illustrated in FIG. 1 is just one non-exclusive example of a tape library 10 usable with the present invention, and no limitations are intended based on the specific type and/or size of the tape library 10 shown in FIG. 1.

In various embodiments, as illustrated in FIG. 1, the tape library 10 can include one or more of: (i) a library housing 14 that defines a library interior 16, (ii) a plurality of storage slots 18 that are each configured to receive and selectively retain (and store) a tape cartridge 20, (iii) a rack assembly 22 including one or more racks 32, (iv) a tape cartridge retrieval assembly 24 (also sometimes referred to herein as a "retrieval assembly", a "tape robot", or simply a "robot"), (v) the tape drive system 12 including the one or more tape drives 26, (vi) a power supply 28, (vii) a library control system 30, (viii) a graphical user interface 34 (illustrated in phantom, and also sometimes referred to herein as a "GUI"), and (ix) a climate controller 35. In some embodiments, the climate controller 35 can include one or more temperature controllers 36 (only one temperature controller 36 is illustrated in FIG. 1), and/or one or more humidity controllers 38 (only one humidity controller 38 is illustrated in FIG. 1).

The library housing 14 is configured to retain various components of the tape library 10. For example, in the embodiment illustrated in FIG. 1, the plurality of storage slots 18, the rack assembly 22 including the rack(s) 32, the retrieval assembly 24, the one or more tape drives 26 of the tape drive system 12, the power supply 28, the library control system 30, and the climate controller 35 can all be received and retained at least substantially, if not entirely, within the library interior 16 that is defined by the library housing 14. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped cross-section or any other suitable shaped cross-section. In many embodiments, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the tape cartridge(s) 20. More particularly, in various embodiments, each of the storage slots 18 is configured to receive and retain a single tape cartridge 20. It is noted that no tape cartridges 20 are shown as being retained within the storage slots 18 in FIG. 1 for clarity.

The tape library 10 can include any suitable number of storage slots 18, and/or the tape library 10 can be designed to retain any suitable number of tape cartridges 20. Moreover, the storage slots 18 can be arranged within the tape library 10 in any suitable manner. For example, in certain embodiments, the tape library 10 can include forty storage slots 18 arranged in two four-by-five storage areas. More particularly, in this embodiment, the tape library 10 includes two magazines 39, one on each side of the retrieval assembly 24, with each magazine 39 including four columns of storage slots 18, and with each column having five storage slots 18 oriented substantially horizontally one on top of another (with limited spacing therebetween). It is understood that from the simplified top view shown in FIG. 1, the number of storage slots 18 in each column is not readily apparent. Alternatively, the tape library 10 can include greater than forty or fewer than forty storage slots 18 and/or the storage slots 18 can be arranged in a different manner than is illustrated and described in relation to FIG. 1. For example, in certain non-exclusive alternative embodiments, the tape library 10 can be configured to include hundreds or even thousands of storage slots 18, each being configured to receive and retain a separate tape cartridge 20.

The design and configuration of the rack assembly 22 can be varied to suit the specific requirements of the tape library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a tape cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The retrieval assembly 24, or robot, selectively, such as upon request of a user or host application, retrieves and moves the tape cartridge 20 as desired between the storage slots 18 and the tape drives 26. In particular, during use, upon receiving a signal from the library control system 30 to access a certain tape cartridge 20, the retrieval assembly 24 can be manipulated to physically retrieve the requested tape cartridge 20 from its associated storage slot 18 in the tape library 10. Subsequently, the retrieval assembly 24 moves the tape cartridge 20 to an appropriate tape drive 26, and inserts the tape cartridge 20 into a drive housing 40 of the tape drive 26 so that the requested read/write operations can be performed. Upon completion of the requested read/write operations, the retrieval assembly 24 can then return the tape cartridge 20 to an appropriate storage slot 18.

It is appreciated that although a single retrieval assembly 24 is illustrated in FIG. 1, the tape library 10 can be designed to include more than one retrieval assembly 24. For example, in one non-exclusive alternative embodiment, the tape library 10 can include two retrieval assemblies 24 that function in different portions of the tape library 10 and/or that provide redundancy in the event that one of the retrieval assemblies 24 fails.

The one or more tape drives 26 can be configured for reading and/or writing data with respect to the tape cartridge 20. The number of tape drives 26 provided within the tape library 10 can be varied to suit the specific requirements of the tape library 10. For example, in certain embodiments, the tape library 10 can include three tape drives 26 that are stacked substantially one on top of another (with limited spacing therebetween). Alternatively, the tape library 10 can include greater than three or fewer than three tape drives 26 and/or the tape drives 26 can be positioned in a different manner relative to one another. For example, in some non-exclusive alternative embodiments, the tape library 10 can be configured to include one hundred or more tape drives 26.

In certain embodiments, the tape library 10 can include more than a single tape drive system 12 for purposes of providing the one or more tape drives 26. For example, in some embodiments, the tape library 10 can include a plurality of tape drive systems 12, with each tape drive system 12 including one or more individual tape drives 26. In one embodiment, the tape library 10 can include three individual tape drive systems 12, with each tape drive system 12 including a single tape drive 26, to provide a total of three tape drives 26 for the tape library 10. Alternatively, the tape library 10 can include any desired number of tape drive systems 12 and/or tape drives 26.

The power supply 28 provides electrical power in a well-known manner to the one or more tape drives 26, the retrieval assembly 24, the library control system 30 and/or additional tape libraries 10. The power supply 28 can be interfaced with these components as well as with an external power source in a well-known manner using industry standard cabling and connections. Alternatively, the power supply 28 can be interfaced with these components in another manner.

The library control system 30 provides the desired and necessary control for oversight functionality of the tape library 10. The library control system 30 can have any suitable design, many of which are well-known in the industry. For example, in one embodiment, the library control system 30 can include a standard driver interface unit for receiving digital commands and translating the commands into driving currents, such as step pulses for controlling stepper motors, and/or for controlling the climate controller 35. In certain embodiments, the library control system 30 can include a standard programmable general-purpose computer formed on a single plug-in card unit and can include a programmed microprocessor or microcontroller, memory, communication interface, control interface, connectors, etc. Alternatively, the library control system 30 can have a different design and/or the library control system 30 can be positioned within the tape library 10 in a different position or manner than that illustrated in FIG. 1.

The tape library 10 can use well-known industry standard cabling and communication protocols between the library control system 30 and other structures of the tape library 10. Cabling and electrical characteristics including signaling protocols can be generally standardized, and the logical message protocols can be either proprietary or standardized as known to those skilled in the art.

As shown, the tape library 10 can also include the GUI 34, such as an interactive touchscreen graphical user interface or another suitable graphical user interface, which allows the user or host to interact with and/or transmit requests or commands to and/or from the tape library 10.

The climate controller 35 controls the climate within the library interior 16. In various embodiments, the climate controller 35 can regulate, adjust, control and/or maintain a specific climate within the library interior 16. In certain embodiments, at various times, the specific climate that is regulated, adjusted, controlled and/or maintained by the climate controller 35 within the library interior 16 can be based on a climate outside of the library interior 16. As noted, in certain embodiments, the climate controller 35 includes the temperature controller 36 and the humidity controller 38.

The temperature controller 36 regulates and/or adjusts the temperature within the library interior 16 of the tape library 10. The design and/or particular type of temperature controller 36 included in the tape library 10 can vary. For example, the temperature controller 36 can include any suitable type of cooling unit that can selectively lower the temperature within the library interior 16; and/or the temperature controller 36 can include any suitable type of heating unit that can selectively increase the temperature within the library interior 16. In various embodiments, the temperature controller 36 can include one or more temperature sensors 42 (only one temperature sensor 42 is illustrated in FIG. 1) that can sense an ambient temperature within or outside of the library interior 16. The temperature sensor(s) 42 can have any suitable design and/or can be positioned in any suitable location(s), such as within and outside of the library interior 16 of the tape library 10. In certain embodiments, the temperature controller 36 can receive data from the temperature sensor 42, and automatically adjust and/or control the temperature within the library interior 16 in accordance with predetermined temperature standards based on such data.

The humidity controller 38 regulates and/or adjusts the humidity within the library interior 16 of the tape library 10. The design and/or particular type of humidity controller 38 included in the tape library 10 can vary. For example, the humidity controller 38 can include any type of humidifier or dehumidifier, or any other suitable type of humidity controller 38 that can selectively change (raise or lower) and/or control the humidity within the library interior 16. In various embodiments, the humidity controller 38 can include one or more humidity sensors 44 (only one humidity sensor 44 is illustrated in FIG. 1) that can sense the humidity within or outside of the library interior 16. The humidity sensor(s) 44 can have any suitable design and/or can be positioned in any suitable location(s), such as within and outside of the library interior 16 of the tape library 10. In certain embodiments, the humidity controller 38 can receive data from the humidity sensor 44, and automatically adjust and/or control the humidity within the library interior 16 in accordance with predetermined humidity standards based on such data.

Figure 2:
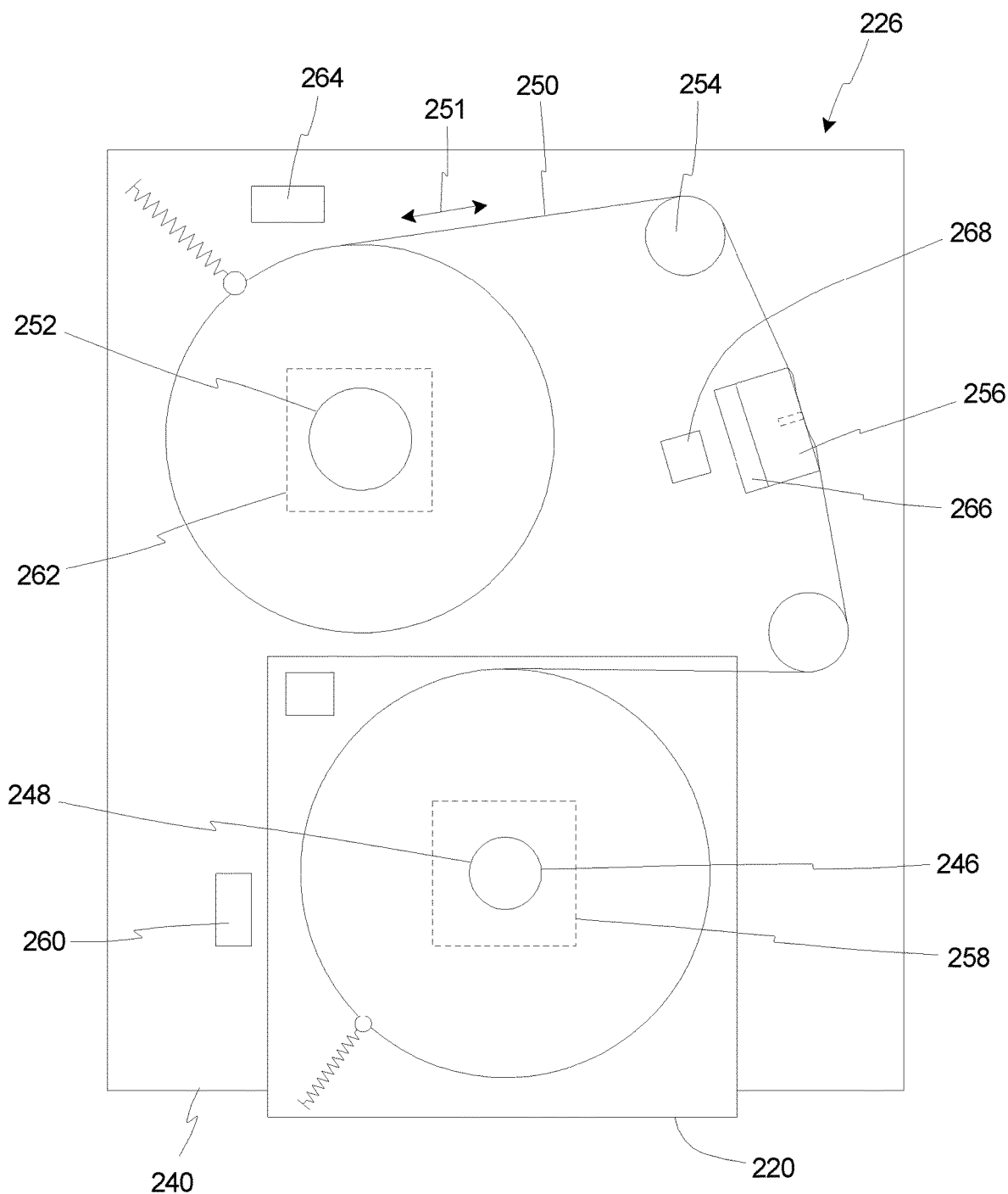
FIG. 2 is a simplified schematic top view illustration of a magnetic tape drive having features of the present invention, and a magnetic tape cartridge that has been inserted into the magnetic tape drive, which can be included as part of the tape library system illustrated in FIG. 1.

FIG. 2 is a simplified schematic top view illustration of a magnetic tape drive 226, and a magnetic tape cartridge 220 that has been inserted into the tape drive 226, which can be included as part of the tape library system 10 illustrated in FIG. 1. Alternatively, the magnetic tape drive 226 can be provided and/or utilized in any suitable manner independently from the tape library system 10.

In FIG. 2, covers for the tape drive 226 and the tape cartridge 220 have been omitted for clarity so that the interior of such components is visible. As shown, the tape cartridge 220 is configured to retain a magnetic tape 250. It is appreciated that the tape drive 226 as shown in FIG. 2, in certain aspects, represents a generic tape drive in terms of overall size, shape and design, and is shown by way of example and not by way of limitation. In some embodiments, the tape drive 226 operates in compliance with an LTO specification, such as LTO-8 or LTO-9. Stated in another manner, in such embodiments, the tape cartridge 220 is an LTO-compatible tape cartridge.

During use of the tape drive 226, the tape cartridge 220 is inserted into a drive housing 240 of the tape drive 226 so that the tape drive 226 can read data from and/or write data to the tape cartridge 220. As shown, the tape cartridge 220 includes a cartridge reel 246 that includes and/or defines a cartridge hub 248. The magnetic tape 250 is spooled about the cartridge hub 248 of the cartridge reel 246. In certain embodiments, the magnetic tape 250 can include at least one servo track (not shown) and a plurality of data tracks (not shown) that run along a longitudinal length of the magnetic tape 250. Each of these tracks can be positioned substantially parallel to each other.

The tape cartridge 220 supplies the magnetic tape 250 to the tape drive 226. More particularly, when the tape cartridge 220 is inserted into the drive housing 240 of the tape drive 226, one end of the magnetic tape 250 is taken up within the tape drive 226 to be wrapped around a drive reel 252 included in the tape drive 226. The magnetic tape 250 traverses a predefined path 251 (illustrated as a two-headed arrow) between the cartridge reel 246 and the drive reel 252, which is defined, at least in part, by one or more rollers 254 (two are shown in FIG. 2) positioned at strategic positions along the predefined path 251. The rollers 254 may also aid in limiting gross lateral movement (i.e. in and out of the page as shown in FIG. 2) of the magnetic tape 250, sometimes referred to as lateral tape motion or "LTM".

Along the predefined path 251, the drive reel 252 moves the magnetic tape 250 across a tape head assembly 256 (also sometimes referred to herein as a "head assembly", "tape heads" or simply as a "head") that is configured to read data from and/or write data to the magnetic tape 250. In alternative embodiments, the head assembly 256 can include at least one read head, at least one write head, and at least one read/write head. In particular, the head assembly 256 is positioned in close proximity to the predefined path 251 of the magnetic tape 250 such that as the magnetic tape 250 travels in the longitudinal direction (by being wound from the cartridge reel 246 to the drive reel 252 or vice versa) the head assembly 256 can read/write data to particular tracks and longitudinal positions of the magnetic tape 250. The head assembly 256 and/or a separate head assembly can include one or more servo elements configured to read the servo track(s) of the magnetic tape 250 in order to effectively maintain proper alignment between the head assembly 256 and the magnetic tape 250. It is appreciated that the tape drive 226 can include any suitable number of heads within the head assembly 256 for purposes of reading data from and/or writing data to the magnetic tape 250. For example, in one non-exclusive embodiment, the head assembly 256 can include 32 heads for purposes of reading data from and/or writing data to 32 data tracks on the magnetic tape 250.

In some embodiments, as shown, the tape drive 226 can also include a cartridge reel motor 258 (illustrated as a box in phantom) that generates the necessary force to rotate the cartridge reel 246 at will, and a cartridge reel encoder 260, such as a sensor or detector, that is configured to output signals representing the pulse rate (or rotation rate) of the cartridge reel motor 258.

In certain embodiments, the tape drive 226 can include a drive reel motor 262 (illustrated as a box in phantom) that generates the necessary force to rotate the drive reel 252 at will, and a drive reel encoder 264, such as a sensor or detector, that is configured to output signals representing the pulse rate (or rotation rate) of the drive reel motor 262.

As illustrated in this embodiment, the tape drive 226 also includes an actuator 266 and a drive controller 268, including one or more processors and circuits, that can be communicatively coupled to the head assembly 256. The actuator 266 is configured to control the lateral position of the head assembly 256 and/or the individual heads of the head assembly 256 relative to the magnetic tape 250 based on a signal provided by the drive controller 268. As such, the actuator 266 comprises a mechanical positioner to move the head assembly 256 up or down laterally. By controlling the lateral position of the head assembly 256 relative to the magnetic tape 250, particular tracks of the magnetic tape 250 can be accessed as desired. Alternatively, the tape drive 226 can include more than one actuator 266. For example, the tape drive 226 can include a separate actuator 266 for each head.

The drive controller 268 is in communication with the actuator 266 and a number of other components within the tape drive 226. For example, although not specifically shown in FIG. 2, each of the cartridge reel motor 258, the cartridge reel encoder 260, the drive reel motor 262, and the drive reel encoder 264 can be in communication with the drive controller 268. As such, the drive controller 268 can be configured to perform various specified operations, either individually, or in combination with other software, hardware and/or firmware elements.

In accordance with various embodiments of the present invention, the tape drive 226 and/or an object storage system 370 (illustrated in FIG. 3) in which the tape drive 226 may be used, can use multi-dimensional erasure codes such that each data file with local parity protection is written to a single magnetic tape medium providing low latencies, but different data files are also erasure coded across multiple tape media thereby generating additional parity tapes at and among each of the magnetic tape media. Stated in another manner, the object storage system 370 utilizes multiple layers of erasure coding, including (i) applying erasure coding to the data and laying it out linearly on a single tape medium such as to accommodate an erasure (literally) on that tape medium and recover the data, and (ii) applying erasure coding to the data and laying it out across several tape media, such as to accommodate a damaged or lost tape medium (for example). Thus, the object storage system 370 incorporates a per-tape dimension and a multi-tape dimension of interleaved erasure code.

The use of multi-dimensional erasure codes permits using a single tape medium when a random object/file is requested and the object storage system 370 is still able to correct for local correlated random errors within that tape medium. In the case where the error condition is determined to be severe enough by satisfying a severity threshold (such as being identified as completely damaged or with a full data set error being unrecoverable) where the local code is not able to help with reconstruction, the other tape media of the multiple tape media are requested for the rebuild and utilized to reconstruct/restore the magnetic tape medium, object, file, data set, metadata thereon and/or parity.

Figure 3:
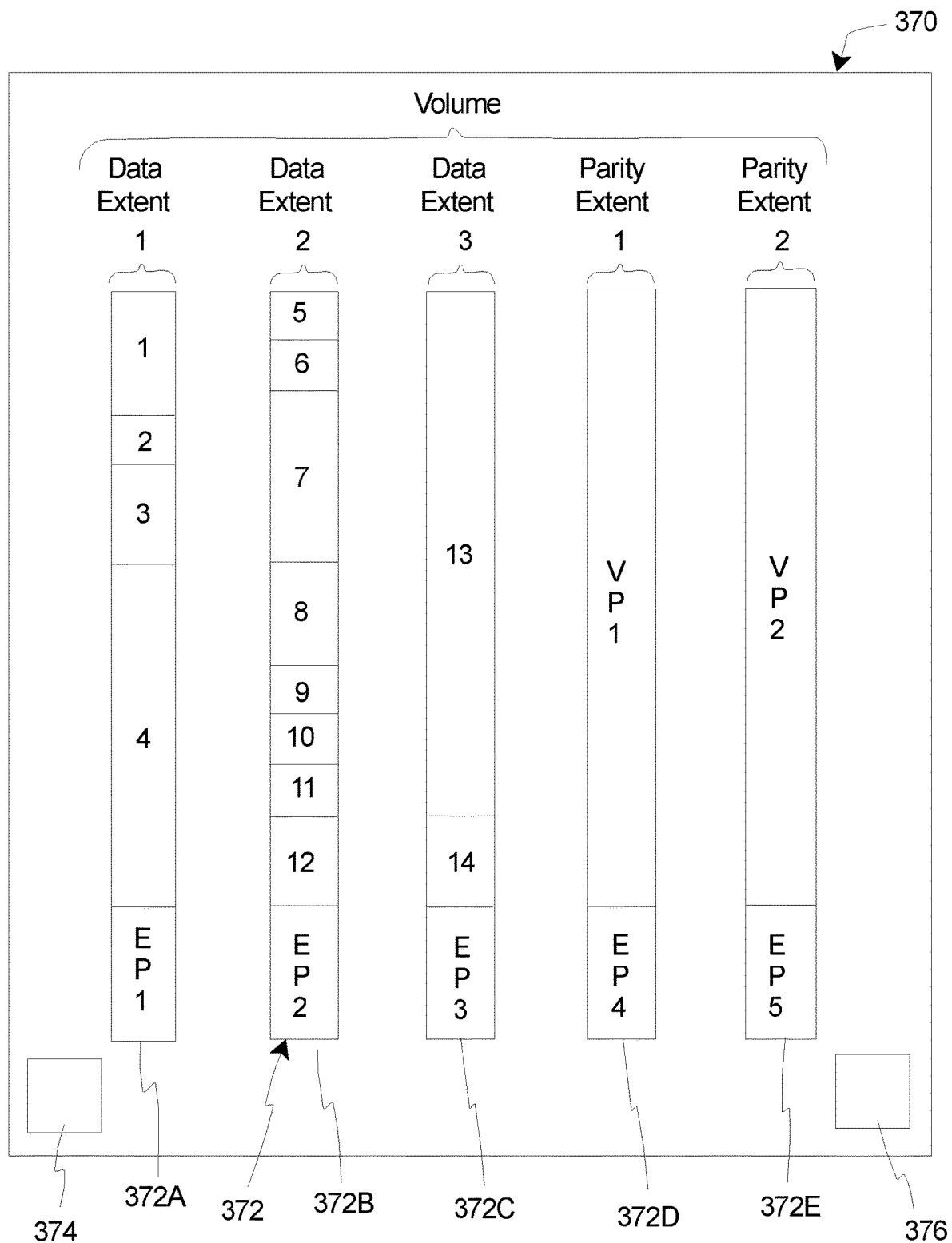
FIG. 3 is a simplified schematic illustration of an embodiment of an object storage system having features of the present invention.

FIG. 3 is a simplified schematic illustration of an embodiment of an object storage system 370 having features of the present invention. As illustrated in this embodiment, the object storage system 370 can incorporate at least a plurality of tape media 372 (such as five tape media 372 in this particular example, although it is appreciated that the object storage system 370 can include any suitable number of tape media 372), an ingest area 374 (illustrated as a box), and object storage software 376 (illustrated as a box). Alternatively, the object storage system 370 can include more components or fewer components than what is specifically illustrated in FIG. 3. For example, in certain other non-exclusive alternative embodiments, the object storage system 370 can be configured to include a different number of tape media 372, which can be fewer than five tape media 372, or more than five (up to hundreds or thousands in certain non-exclusive alternative embodiments) tape media 372.

It is appreciated that although the embodiments of the present invention illustrated and described herein generally refer to the use of tape media within the object storage system, in alternative embodiments different types of storage media can also be utilized. Thus, the reference to tape media is not intended to be limiting in any manner except as referred to in any claims relating to the present invention now or in the future.

In various implementations, the object storage system 370 can be an integrated system that includes the object storage software 376 that controls both non-tape media (such as can be included within the ingest area 374), such as hard disk drives (HDD) or other suitable non-tape storage media, and the tape media 372 as individual storage devices. In such implementations, both types of storage media are controlled via the object storage software 376 incorporated within the single integrated object storage system 370, as opposed to utilizing two separate object storage systems which interface with one another, and with each separate object storage system utilizing a different storage media type and with its own software.

It is appreciated that clients of an object storage system, such as the object storage system 370 illustrated in FIG. 3, expect a response acknowledging a write to the object storage system 370 within a few dozen to hundreds of milliseconds after streaming the last byte of data and that data is durably stored before acknowledging that write. Thus, using tape as an immediate storage medium is unwieldy. In certain embodiments, as shown in FIG. 3, a first solution includes the process of storing incoming objects in the ingest area 374. In various embodiments, the ingest area 374 is a non-tape-based storage medium. In one such embodiment, the ingest area 374 is an HDD-backed erasure-coded object storage system. However, in other such embodiments, it could be any storage system using any storage medium that provides persistence and millisecond response times for writing, such as hard disk drives (HDD), solid state drives (SSD), non-volatile memory express (NVME), battery-backed random-access memory (RAM), or any other suitable storage medium.

Thus, in certain embodiments, the object storage software 376 is configured to manage the object storage system 370 with multiple tiers, an ingest tier such as an HDD tier, and a tape tier. Importantly, as noted, the HDD tier serves as the ingest/staging area 374 for the tape tier (the plurality of tape media 372), and the object storage software 376 is configured to control both tiers within the single, integrated object storage system 370.

During use of the object storage system 370, data objects (numbered 1-14 in FIG. 3, and also sometimes referred to herein simply as "objects") accumulate in the ingest area 374 until the system deems sufficient objects are available for them to be grouped together in what can be referred to as a "volume of data" or simply a "volume". What "sufficient" means can be determined through a combination of factors, such as but not limited to number of objects, cumulative size in bytes, available space in the ingest area, etc. It is appreciated that a single volume can easily contain millions of objects. The ingest area 374 can also be utilized to ensure that the objects and/or volume of data is properly organized and/or formatted while in the ingest area 374 so that the volume of data can be streamed continuously from beginning to end.

Next, redundancy is generated, with the goal being to eventually protect the volume across multiple different (tape) storage devices, such as a first tape medium 372A, a second tape medium 372B, a third tape medium 372C, a fourth tape medium 372D and a fifth tape medium 372E in this particular non-exclusive embodiment, although, as noted, the object storage system 370 can include any suitable number of tape media 372. Using erasure coding, which can entail reading all of the user data, the volume can be split into multiple parts, which can be referred to as data extents, and can generate extra parity extents (also referred to as "extent parities") (identified, for example, as "EP1", "EP2", "EP3") which contain redundant information (a multi-copy strategy is a special case of this method and is thus also covered). The server performing the erasure coding reads the objects in the same offsets in the data extents in parallel and generates the parities at this offset, hence creating parity extents. As an example, FIG. 3 depicts a volume with 14 objects, that is protected with a 3+2 erasure code (such as with three data extents and two parity extents, although the object storage system 370 can include any suitable number of data extents and parity extents). In particular, in this non-exclusive representative embodiment, the objects are divided over three data extents: data extent one contains objects 1-4, data extent two contains objects 5-12, and data extent three contains objects 13-14. The two generated parity extents contain the volume parities, VP1 and VP2. With such configuration, it is appreciated that in order to effectively reconstruct the volume, it suffices to have any three out of these five extents. So, if these extents are stored on five different (tape) media, such as shown in FIG. 3, the data can be effectively reconstructed if no more than two media fail.

Certain specific non-exclusive manners and/or implementations for generating the erasure coding to provide the desired redundancy will be described in greater detail herein below.

It is appreciated that the data, the objects and/or the volume parities (collectively the "data") can be divided amongst the tape media 372A-372E in any suitable manner. In one implementation, the data can be padded as necessary within each tape medium 372A-372E such that each of the extents, such as the three data extents 372A-372C and the two parity extents 372D-372E in this particular example, are substantially equal in size. With such design, it is appreciated that no objects in the volume will be split over multiple tape media. Alternatively, the data and/or objects can be divided amongst the data extents without any padding.

An important aspect of this method is that a read request for an individual object can be served from a single tape medium (using a single tape drive). For example, in FIG. 3, a read request relating to object 7 only requires use of the second tape medium 372B, which holds data extent 2.

Apart from total media failure, local failures are another common failure mode. On tape, this can mean that a few meters of tape is damaged, thereby making a few gigabytes of data unreadable. In such situations, the affected objects can be reconstructed from the other extents in the volume stored on different tape media, just like in situations in which the entire tape would have failed. However, that requires multiple tape loads so it would typically consume a lot of drive resources. Therefore, by also erasure coding "in a second dimension", by adding redundancy to the extent itself locally, the method is enhanced so that partial tape failures can be effectively repaired without requiring data stored on other tape media. In particular, as illustrated, by using erasure coding, an "extent parity" can be calculated for each tape that locally protects the objects in that extent, thus stored on the same tape medium. This code can be very efficient, with only a few percent of overhead being required, and only marginally affecting total storage overhead. In FIG. 3, the extent parity "EP1" protects objects 1-4, the extent parity "EP2" protects objects 5-12, the extent parity "EP3" protects objects 13-14, the extent parity "EP4" protects volume parity "VP1", and the extent parity "EP5" protects volume parity "VP2".

By way of example, assume the local damage runs across the end of object 2 and the beginning of object 3. Reading the entire data extent 1 included within the first tape medium 372A—objects 1, 2(*partial*), 3(*partial*), 4 and the extent parity EP1—allows reconstructing objects 2 and 3 in their entirety. It is appreciated that the extent parity can be added when the extent is created, calculated later as part of the transfer to tape, or at another suitable time or in another suitable manner.

In this fashion, the volume-parity acts as an across-tape erasure code, whereas the extent-parity is a within-tape erasure code, hence the term "two-dimensional erasure code". Evidently, as an alternative to using these two dimensions together at the same time, one could also protect the data by only using either of them separately.

As a result of using the two-dimensional erasure coding scheme, the object storage system 370 includes and/or generates any suitable number of extents, each destined for a different tape medium. An extent could be streamed to a tape drive immediately or could be stored in the ingest area 374 or another suitable "staging area". For example, a next-gen tape drive could include an HDD/flash-based staging area.

Streaming all the extents immediately requires the server that calculates the volume parity to concurrently drive traffic to multiple, potentially dozens, of tape drives in a coordinated fashion. At least the parity extents need to be handled immediately. The data extents could be "recreated" individually by streaming the objects in that extent from the ingest area 374 to the tape medium 372. However, that would not be very resource—efficient, as the objects may be small, having a detrimental impact on the write throughput to the tape medium 372. As tape drives require a minimum speed or they will start "shoe-shining" (causing wear & tear which reduces durability), it is important that this server is able to deliver sufficient throughput to all tape drives in parallel. This also requires these tape drives to work in lockstep, such that if one of the tape drives slows down and/or stops, all tape drives will have to do the same, etc.

Therefore, the alternative of staging the extents (in the ingest tier again or somewhere else) is attractive. Different extents can then move to tape independently from the other extents in the volume, which has multiple advantages:

1. One can wait until the extents for multiple volumes have been staged and then create a single large write request that writes multiple extents (evidently of different volumes) to a single tape. By reading just the extents in the ingest area 374, it is appreciated that wear and tear on the tape media can be effectively inhibited.

2. The total number of (parity) extents can exceed the total number of available tape drives. Even a single drive suffices, because the staging method allows for sequentially copying every extent to tape one by one.

3. Multiple drives do not need to operate at the same speed at the same time, because each write request directed toward a given tape medium is independent of other write requests.

It is noted that the objects stored in the ingest area 374 can already be removed when the extents have been stored in the ingest/staging area 374, because they are already protected by at least the across-tape erasure coding scheme. Finally, when an extent is durably stored on tape, the extents can also be removed from the ingest/staging area 374 to free up space in that area.

In certain implementations of the present invention, erasure coding can be a forward error correction code where both encoding and decoding are utilized. Erasure coded tape media can provide low latency to a first byte of user data, high durability with low storage overhead based on orthogonal multi-dimensional forward error correction codes by utilizing iterative decoding processes, such as by a local per-tape dimension and a global multi-tape dimension. User files can be encoded based on the dimensions, and each encoded user data file with corresponding parity can be written to an individual tape medium resulting in a set of individually erasure coded data tape media. In such situations, additional parity tape media can be generated using the other dimensions from the erasure coded data tape media generating orthogonal multi-dimensional erasure coded tape media.

During the restore process, the user data files can be decoded using an individual tape medium where local per-tape errors beyond the tape's internal format ECC power are corrected using the dimension that pertains to the per-tape erasure code. Errors beyond the capability of per-tape dimension of the erasure code, including the loss of or completely damaged tape media, can be corrected/re-written using the remainder of the tape media belonging to the multi-dimensional erasure code set of tape media where the erasures are corrected using iteration between the orthogonal code dimensions back and forth. Interleaving can also be utilized on multi-tape and per-tape (global and local protection) as a function of randomizing correlated errors.

In one aspect of the present invention, read operations can function by non-stopping where there are one or more errors for one or both local and global protections to minimize tape wear and performing any action to maintain a streaming mode. In a stream mode of for example the drive reads the tape medium with errors and provides user or host the full or even partial data sets. A data set is the tape medium's internal data sets similar to disk drive sector. As the drive operates to read it can stream through and give partial or full data sets as it recovers without stopping and let erasure coded tape media set to recover the user data.

When writing to tape media with multi-dimensional orthogonal erasure codes, this can be an asynchronous operation where erasure encoded objects/files using a per-tape dimension are each written to different magnetic tape media without waiting for others. The writing can be a per-tape dimension independent of one another, wherein a writing of parity tape media from data tape media using a multiple data tape dimension is performed during or after the writing of the data tape media making the writing process an asynchronous independent process. A reply can then be sent back to one or more user devices that the data, files, or objects are written to the tape media with erasure coding as the per-tape dimension is written to individual tape media, where the writing of the parity tape media writing proceeds during or after the reply back, for example.

As noted above, utilizing conventional systems, it is appreciated that making multiple copies of the data can be very inefficient. For example, to protect against two tape failures, one requires three copies, thus experiencing a 300% storage overhead. Conversely, with the present invention, a 18+2 across tape erasure code protects against two tape failures with only 111% overhead. Moreover, adding the second erasure coding dimension adds only 4 or 5%, so a total 2-D EC overhead of only 116% is required. In petabyte-sized systems with thousands of tape media, the difference in total cost can be huge.

Also, in conventional systems where each object is erasure coded individually, the object data is broken up into multiple parts which are stored on different tape media. Hence, reading the object back requires one to load multiple tape media into tape drives. For instance, when using a 3+1 erasure code, data is spread over three tape media. This is detrimental to the system/drive I/O efficiency, as the time to read from a tape medium is dominated by the time it takes to deliver the tape medium to the drive, mount the tape medium and then position at the correct offset. This process typically takes over a minute, and only then actual data transfer and/or I/O happens, typically taking seconds (such as with LTO-8 at 350 MB/sec), before another minute of drive time is spent on rewind and unmount. Consequently, a strategy which needs to do three tape loads to read 3×10 MB, uses way more (drive and robot) resources than with the present invention, which reads 30 MB from a single tape medium.

In some conventional systems, aggregating multiple objects together is a method to alleviate the problem described in the previous paragraph. The current state-of-the-art only aggregates requests that are concurrently "in flight". However, as clients expect a response within a few (hundred) milliseconds after writing the data, even a busy system typically has only a few thousand requests in flight at any given time. This approach can aggregate data, but never enough data to always result in terabyte-sized tape writes. As described in detail herein, with the present invention, using an ingest/staging area 374, allows the user to aggregate millions of objects and terabytes of data before doing any tape writes. More particularly, by providing an object interface atop the ingest/staging area 374, and using the ingest/staging area 374 as a path to tape, ingested object data can be processed before putting it to tape. This causes far less tape loads and unloads, and far less physical tape movement, hence optimizing durability as well as maximizing tape write performance.

In consideration of certain deficiencies of magnetic tapes and erasure coding, various embodiments/aspects are disclosed for achieving minimum latency and adaptive parity protection feedback from the media for capacity optimized geographic distribution. In particular, magnetic tape devices or systems can interleave chunks (or fragments) of code words (CWs) of an erasure encoded object or file to enable using a single magnetic tape only in response to a random object/file request and correcting for a local correlated error within the single magnetic tape itself without using another different magnetic tape as a first option.

An encoding logic component further utilizes other magnetic tapes to generate additional parity tapes. These additional parity tapes can be used to recover an error of the single magnetic tape in response to the error satisfying a threshold severity for a reconstruction of the erasure coded object or the CW, where the encoding logic is controlled, at least in part, by one or more iteration coding processes between erasure code dimensions that are orthogonal to one another. In response to not satisfying the threshold severity, the error can be corrected with the single magnetic tape alone.

An interleave component interleaves chunks of a CW of one or more other different magnetic tapes with chunk(s) of the CW into a plurality of records, distributes the plurality of records across the data storage devices (such as other magnetic tapes or other suitable data storage devices), and interleaves the one or more chunks of the CW across the single magnetic tape with at least one of the chunks of the one or more CWs associated with a different data storage device, such as a different magnetic tape, of the plurality of data storage devices. The interleave component or encoding logic further generates one or more additional parities from one or more chunks of the CW with corresponding parities and distributes the one or more additional parities to different parity tapes, respectively.

Iteration and interleaving using orthogonal multi-dimensional erasure codes where each user file (or data object) is written to an individual tape and where these tapes are protected by the other dimension using multiple tapes enables the various aspects herein. In particular, iteration process with the erasure codes of chunk(s) of CWs can minimize the erasure code overhead and still achieve very high durability without increasing cost due to excessive overhead. Use of iteration and multi-dimensions collectively achieves this.

In one example, as noted, two dimensions can be utilized. One dimension is per-tape or a single magnetic tape, where the second is multi-tape. Each erasure code (EC) policy can be configured for a specific probability of errors being seen such as a per-tape policy that can be designed for local tape errors, which are more dominant compared to loss of fully damaged tapes (or severely damaged). The multi-tape dimension can be configured for the probability of loss of or damaged tapes where the error probability (or severity) is different compared to per-tape. The orthogonality and correlation between the dimensions plus the unique interleaving increases the durability without requiring both dimensions to have more parities that can increase overall storage overhead and cost. The interleaving helps with the power of iterative erasure decoding erasure codes with iteration, so these operations are correlated as technologies among dimensions.

With interleaving by iteration, data chunks from the same codewords across multiple tapes can be arranged such that they are not correlated as a function of tape position (such as if all chunks are written at beginning of tape (BOT) or a beginning portion/fraction of each tape, a systematic tracking error at BOT will result in erasure coding to be useless), the decoder (decoding component) can use iterative decoding to achieve very high durability with low overhead.

Erasure coding files such that they are each written to individual tapes can be ideal for tape applications where latency to the first user byte is critical such as active archive application(s). With disk applications, erasure coded user files can be spread across multiple disks and because disks are always online and available this does not affect latency, but helps it. However, with tape the use case is totally different. Tapes are usually offline, and only online when they are loaded into drives. Additionally, in all tape applications, the library systems can have a ratio of 1 drive per N tapes where N is typically about 100. This can require a different erasure code concept compared to disk application.

If parity is set to a per-tape dimension, the same low latency can be achieved, and the failure rates in tapes can be very high due to interactions between drives and tapes. This is because of the removability of tape media and the drive, unlike disk drives. Local sections of tapes can be bad or lower quality of magnetics or can exhibit tape surface edge physical problems making the system encounter errors and delays during the read which will increase latencies in a different way. A per-tape dimension for EC can solve this especially when the drive is commanded to read data with errors without stopping or performing re-tries. So, the multi-dimension interleave plus read without stopping all collectively help to reduce the latencies. Further, the probability of a total tape loss or pin drop or tape cut is very low, perhaps less than 0.1%. However, the probability of tape and drive having extensive delays due to various retries that some may result in errors is much higher, perhaps 4-5%.

Another benefit of using multi-dimensions, where local tape errors are fixed on the fly without stopping tape during read, is the prevention of tape damage due to physical back-hitch motions during drive retries due to local tape errors. When a disk has an error, the drive does not stop and restart, the head component simply waits for the data to come back in next disk revolution. With tape, the drive stops, goes back, stops and restarts to re-read the bad section and does this multiple times until it recovers data. These back-hitches can result in tape damage and impact data durability negatively. Certain method(s) can function to inhibit these since with a per-tape dimension, and reading without stopping eliminates back-hitches during read, increased life and durability of the media can be achieved. To note, each media has a limited number of passes across the head and as capacities increase each generation, the number of tracks also increase, but number passes for EOL (end of life) is basically the same as previous generations. Elimination of back-hitches during reading, can improve efficiency with respect to the tape wear, especially since current methods increase pass counts due to read retries and back-hitches.

Another benefit of multi-dimension, where local errors are corrected by the per-tape dimension, is the ability of self-repairing suspect or locally damaged tapes without requiring other tapes. This helps with drive resource management and also due to local rebuild characteristics using a per-tape erasure code dimension where erasure coded chunks are also interleaved over the tape, which helps with ten bandwidth requirements/throughput. According to various aspects/embodiments, a drive can be configured to repair a tape using its internal hardware and logic without requiring the repair to be done at the higher host level, thus adding to the benefits of the present invention.

In other aspects, a self-description of the tapes in themselves can be used without any hardware to reconstruct the entire data set after a disaster event where only the tapes may be available. This can be included in the multi-dimension erasure coding so one can replace a tape or tapes from a set of erasure coded tapes and the metadata that goes with the tapes and new tapes is able to describe the correlation between the original user files and tapes.

In another aspect, quality metrics can enable differentiation between drive and tape errors so one can focus on the durability quality of the data written on tapes mainly. As such, the tapes can be configured to have an original data quality (such as defects, random errors, tracking all as a function of the physical tape position using LPOS and wrap numbers) at the time of the originally writing data and keep/store this metadata at/for each tape with the identification of drives that write the data and environmental conditions at the time of writing. Now, either as part of reads when a user requires data or pre-planned scheduled tape scrubbing, the tape device/system can read the quality metric data from the tape(s) and use these to compare them to the original writing to estimate if there is a change in quality or condition to substantially satisfy a defined threshold change such that it is deemed appropriate to migrate the tape to a new one. Tape scrub can be defined as a deterministic manner to read physical locations on a tape to capture the quality metrics. This can be randomly selected locations to save some and pass a number of full volume test, which tests the entire tape surface based on policy.

It is appreciated that tape can be utilized at a lower cost compared to disks; however, when a device demands to be configured for a high durability application for long retention periods, the protection is provided by either replication or erasure coding methods just like in disk systems. Replicated tapes offer good performance, but at a higher cost of ownership due to excessive storage overhead compared to erasure code (EC) systems. Current legacy systems use replicated tapes to store the user data with two or three copies.

In disk applications, for example, the files can be erasure coded and split into chunks where each chunk is written to a different disk in a different node in a different rack in a different data center and potentially in a different geographic location. In tape devices/systems the same process could result in high latencies. As such, embodiments/aspects of the present invention use local recoverable codes (LRCs) where files are erasure coded using multiple tapes. However, to be able read a given file, a single tape can be used where the single tape is part of the overall erasure code topology. Multiple tapes are only required when there is a severe error or unavailability (such as based on a severity threshold) so the probability of latency problem is reduced substantially based on the unique erasure coding and data chunk distribution algorithm. This can keep the latencies to first byte low, while lowering cost and increasing durability due to erasure coding with multiple tapes.

Thus, in an aspect, multi-dimensional erasure codes are configured via a tape device/system such that each file with local parity protection is written to a single tape providing low latencies, but a set of different files can be erasure coded across multiple tapes generating additional parity tapes. The use of this as multi-dimensional erasure codes permits the use of a single tape when a random file is requested and still be able to correct for local correlated random errors within that tape; and in case the error condition is severe enough that the local code is not able to help with reconstruction, the other tape(s) from the set of tapes are requested for the rebuild or reconstruction of the data from any error.

In certain implementations, such as in larger multi-library setups, the different extents can be placed not only on different tape media, but on tape media in different tape libraries, to additionally protect against temporary or permanent tape library failures, such as tape robot failure, power failure, all drives in the library are broken, etc. This greatly increases the availability of the data, as tape robot failures are quite common. Furthermore, the durability of the data is also increased as this protects against the loss of an entire library (such as due to fire, earthquakes, power outages, etc.).

Figure 4:
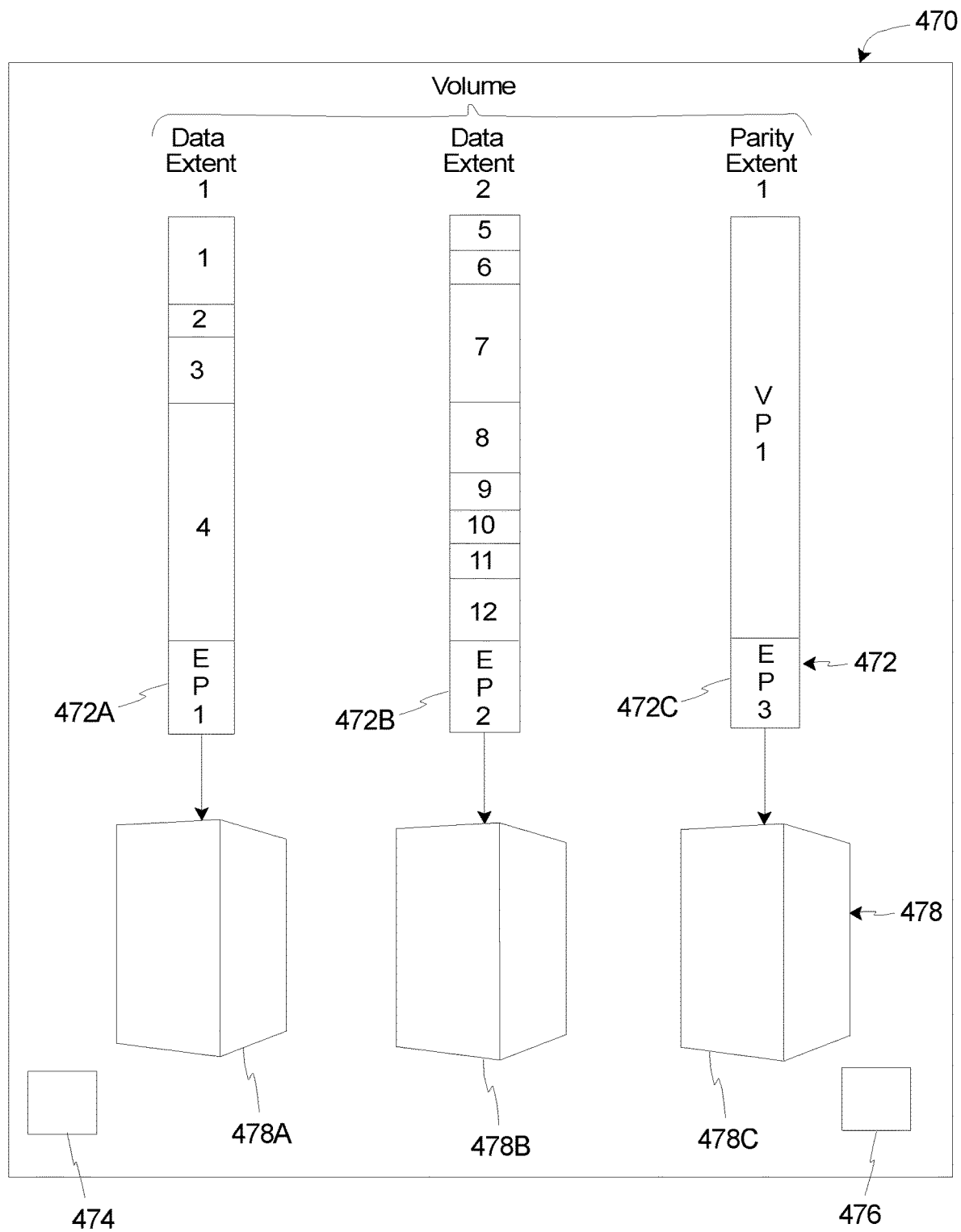
FIG. 4 is a simplified schematic illustration of another embodiment of the object storage system.

FIG. 4 is a simplified schematic illustration of another embodiment of the object storage system 470. In particular, FIG. 4 depicts an example of a volume using 2+1 erasure coding, where the data extents and the parity extent are each stored in a different library. More specifically, FIG. 4 illustrates that, in this embodiment, the object storage system 470 can include one or more of: a plurality of tape media 472, such as a first tape medium 472A, a second tape medium 472B, and a third tape medium 472C, an ingest area 474 (illustrated as a box), object storage software 476 (illustrated as a box), and a plurality of tape libraries 478, such as a first tape library 478A, a second tape library 478B and a third tape library 478C.

As with the previous embodiment, a volume of data is provided in the form of a plurality of data objects, labeled as objects 1-12. In this embodiment, objects 1-4 are contained within the first tape medium 472A (or a first data extent), and objects 5-12 are contained within the second tape medium 472B (or a second data extent). The third tape medium 472C contains a volume parity (VP1) that is a parity extent that is generated from the plurality of objects in a manner substantially similar to what was described herein above. As in the previous embodiment, each of the tape media 472A-472C include an extent parity that is configured to protect the other contents of the respective tape medium. More specifically, in FIG. 4, the extent parity "EP1" protects objects 1-4, the extent parity "EP2" protects objects 5-12, and the extent parity "EP3" protects volume parity "VP1".

As shown in this embodiment, each data extent and/or each tape medium 472A-472C can be contained within a separate tape library 478. More specifically, as shown, the first tape medium 472A (or first data extent) is contained within the first tape library 478A, the second tape medium 472B (or second data extent) is contained within the second tape library 478B, and the third tape medium 472C (or first parity extent) is contained within the third tape library 478C.

Beyond the storing of the plurality of tape media 472 in different tape libraries 478, the general overall operation of the object storage system 470 is substantially similar to the previous embodiment in the manner in which the volume of data and/or the data objects are protected from failure or are recoverable in the case of adverse events or conditions in a two-dimensional erasure code-based object storage system 470. More particularly, during the restore process, the user data files can be decoded using an individual tape medium where local per-tape errors beyond the tape's internal format ECC power are corrected using the dimension that pertains to the per-tape erasure code; and errors beyond the capability of per-tape dimension of the erasure code, including the loss of or completely damaged tape media, can be corrected/re-written using the remainder of the tape media belonging to the multi-dimensional erasure code set of tape media where the erasures are corrected using iteration between the orthogonal code dimensions back and forth.

In one example, if the tape library 478B holding the tape on which data extent 2 is stored would be down, a restore request for any of the objects 5-12 could be served by reading data extent 1 and parity extent 1, which allows the object storage system 470 to recreate the lost objects in data extent 2.

Moreover, by placing multiple libraries in different geographical locations, the object storage system 470 can be better protected against the loss of an entire datacenter, due to power loss, flooding, earthquakes, etc. For example, placing the three tape libraries 478A-478C in FIG. 4 in three different geographical locations protects against these datacenter-wide failure modes.

In certain non-exclusive alternative embodiments, it is appreciated that the ingest area 374, 474 can be somewhat different than has been described herein above. For example, in one non-exclusive alternative embodiment, the ingest area 374, 474 is provided in the form of a containerized ingest area. In such embodiments, objects and erasure code are already aggregated before they are stored in the ingest area 374, 474. Moreover, in such embodiment, all objects need to move to tape. In some instances, having all objects moved together to tape can be somewhat less desirable than other embodiments. For example, in embodiments described herein above, the object storage system 370, 470 can be configured such that one or more subsets of the objects (and not all of the objects) can be moved to tape. In one implementation, only the objects that are cold (such as those not likely to be used for an extended period of time) are moved to tape, while the warm objects (such as those likely to be used and/or accessed in the relatively near future) can be kept in the ingest area 374, 474 until they are desired or until they have been deemed to turn cold.

Figure 5:
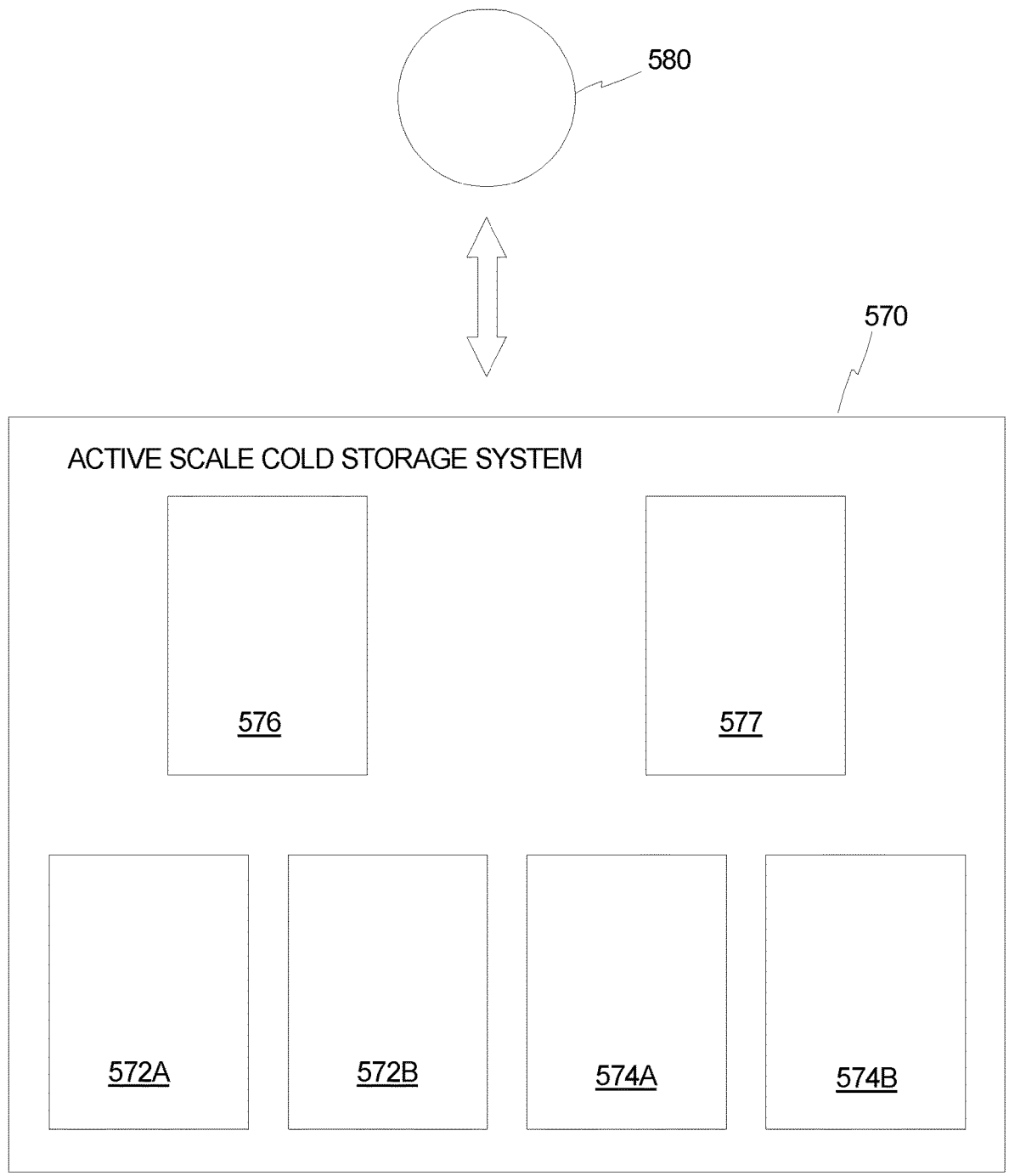
FIG. 5 is a simplified block diagram illustrating an embodiment of a high-level active scale cold object storage system having features of the present invention.

FIG. 5 is a simplified block diagram illustrating an embodiment of a high-level, active scale cold object storage system 570 (also referred to herein simply as an "object storage system") having features of the present invention. As illustrated and described, the object storage system 570 is configured to be used and/or accessed by a user 580 for providing a well-protected, active scale cold storage system for objects, files, data, etc., where the objects, files, data, etc. can be relatively quickly and easily moved into and/or out of the object storage system 570. In many embodiments, the object storage system 570 can have various features and limitations such as described herein above such that the objects, files, data, etc. can be relatively quickly and easily recovered after any type of failure.

As described in various implementations, the present invention entails a fully integrated single object storage system 570 that treats non-tape media, such as hard disk drives (HDD), solid-state drives (SSD) or other suitable non-tape storage media, and tape media as individual storage devices, where the same data objects are stored with unique interleaving and encoding based on the storage devices selected. For instance, an object can be encoded and interleaved using a current AS (Active Scale) EC architecture, and when the same object is moved to tape media within the same physical system it is re-encoded and de-interleaved based on the characteristics of the tape media as the object is moved from HDD to tape media or from tape media back to HDD. In such implementations, metadata is a generalized combined metadata that manages the life of any object on HDD or tape or combined.

The design of the object storage system 570 can be varied. As illustrated in FIG. 5, the object storage system 570 can include (i) one or more first tape media 572A; (ii) one or more second tape media 572B; (iii) one or more first non-tape media 574A; (iv) one or more second non-tape media 574B; (v) object storage software 576; and (vi) object storage hardware 577. Alternatively, the object storage system 570 can include more components or fewer components than what is shown and described in relation to FIG. 5.

The object storage system 570 can include any suitable number of first tape media 572A. In certain implementations, the one or more first tape media 572A can be incorporated within library modules that include the first tape media 572A and tape drives that are managed by robotics (retrieval assemblies).

Similarly, the object storage system 570 can include any suitable number of second tape media 572B. In some implementations, the one or more second tape media 572B can be incorporated within library modules that include the second tape media 572B and tape drives that are managed by robotics (retrieval assemblies).

The object storage system 570 can include any suitable number and type of first non-tape storage media 574A. In certain implementations, the first non-tape storage media 574A can be hard disk drive (HDD) arrays that include any suitable number of HDD. Alternatively, the first non-tape storage media 574A can include arrays of solid-state drives (SSD), non-volatile memory express (NVME), battery-backed random-access memory (RAM), dynamic random-access memory (DRAM), optical drives, DNS drives, or any other suitable storage medium.

Similarly, the object storage system 570 can include any suitable number and type of second non-tape storage media 574B. In some implementations, the second non-tape storage media 574B can be solid-state drive (SSD) arrays that include any suitable number of SSD. Alternatively, the second non-tape storage media 574B can include arrays of hard disk drives (HDD), non-volatile memory express (NVME), battery-backed random-access memory (RAM), dynamic random-access memory (DRAM), optical drives, DNS drives, or any other suitable storage medium.

The object storage software 576 and the object storage hardware 577 can cooperate to control and manage operation of the object storage system 570, and the movement and protection of objects, files, data, etc. into, within, and from the object storage system 570. In various embodiments, the object storage system 570 can utilize the object storage software 576 and/or the object storage hardware 577 as part of a microprocessor-based system that is configured for one or more of (i) managing data durability and performance of user objects; (ii) managing files based on erasure code policies and architectures unique for each storage medium; and (iii) managing storage medium error characteristics and access requirement where data migration between storage media are adaptively optimized to minimize latencies and optimize performance.

During use of the object storage system 570, once the data objects are received and verified, the data objects stay protected within the object storage system 570 due to its unique design, with the incorporation and use of the object storage software 576 and the object storage hardware 577. As described, all storage media types, including tape media, HDD, SSD, NVME, RAM, DRAM, optical drives, DNS drives, etc., are managed by the same microprocessor-based object storage software 576 and object storage hardware 577 using combined metadata policies.

In summary, the present invention is directed toward an object (cold) storage system and method that durably stores objects (on tape or other suitable storage media) that can survive power loss, responds to write requests within seconds, survives a full tape loss, claims less than 200% overhead (hence uses erasure coding), and can read an object back from a single tape. Certain embodiments of the present invention, such as described herein, provide a means for enabling an optimal layout (two-dimensional erasure coding with single tape restores) through the use of an ingest area or staging area.

The present invention is further directed toward such an object storage system that incorporates both non-tape storage media and tape storage media into a single integrated object storage system that includes software usable for actively controlling both storage media types.

Moreover, various embodiments of the present invention enable all of the following properties at the same time: (1) Recreate objects lost due to full tape failures; (2) Recreate objects affected by tape media damage (partial tape failure) without loading other tapes; (3) Performing terabyte-sized writes to tape, reducing wear and tear; (4) Reading an individual object back from a single tape; (5) Recreating an object when the tape library/tape robot which serves the tape that the object is stored on is temporarily or permanently down; and (6) Avoiding extreme storage overhead by using wide erasure codes (without requiring coordinated parallel writing to multiple tape drives).

It is understood that although a number of different embodiments of an object storage system and method have been illustrated and described herein, one or more features of any one embodiment can be combined with one or more features of one or more of the other embodiments, provided that such combination satisfies the intent of the present invention.

While a number of exemplary aspects and embodiments of the object storage system and method have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method for utilizing an object storage system for storing and retrieving a volume of data, the volume of data including a plurality of data objects, the method comprising the steps of:
   accumulating the volume of data to an ingest area provided within a non-taped-based storage medium;
   copying a first subset of the plurality of data objects to a first tape medium;
   copying a second subset of the plurality of data objects to a second tape medium that is independent of the first tape medium; and
   managing the object storage system with object storage software; and wherein the step of managing includes the steps of generating a first extent parity that contains redundant information from the first subset of the plurality of data objects using the object storage software; and writing the first extent parity to the first tape medium using the object storage software.

2. The method of claim 1 wherein the step of accumulating includes the ingest area being provided within one of a hard-disk drive-based storage medium, a solid-state drive-based storage medium, a non-volatile memory express-based storage medium, and a battery-backed random-access memory-based storage medium.

3. The method of claim 1 wherein the step of managing further includes the steps of generating a second extent parity that contains redundant information from the second subset of the plurality of data objects using the object storage software; and writing the second extent parity to the second tape medium using the object storage software.

4. The method of claim 3 wherein the step of generating the first extent parity includes using erasure coding to generate the first extent parity; and wherein the step of generating the second extent parity includes using erasure coding to generate the second extent parity.

5. The method of claim 3 wherein the step of managing further includes the steps of generating a volume parity that contains redundant information from the volume of data using the object storage software; and writing the volume parity to a third tape medium that is independent of the first tape medium and the second tape medium using the object storage software.

6. The method of claim 5 further comprising the steps of retaining the first tape medium within a first tape library; retaining the second tape medium within a second tape library that is different than the first tape library; and retaining the third tape medium within a third tape library that is different than the first tape library and the second tape library.

7. The method of claim 1 further comprising the step of copying a third subset of the plurality of data objects to a third tape medium that is independent of the first tape medium and the second tape medium.

8. The method of claim 7 wherein the step of managing includes the steps of generating a second extent parity that contains redundant information from the second subset of the plurality of data objects using the object storage software; writing the second extent parity to the second tape medium using the object storage software; generating a third extent parity that contains redundant information from the third subset of the plurality of data objects using the object storage software; and writing the third extent parity to the third tape medium using the object storage software.

9. The method of claim 8 wherein the step of managing further includes the steps of generating a first volume parity that contains redundant information from the volume of data using the object storage software; writing the first volume parity to a fourth tape medium that is independent of the first tape medium, the second tape medium and the third tape medium using the object storage software; generating a second volume parity that contains redundant information from the volume of data using the object storage software; and writing the second volume parity to a fifth tape medium that is independent of the first tape medium, the second tape medium, the third tape medium and the fourth tape medium using the object storage software.

10. An object storage system for storing and retrieving a volume of data, the volume of data including a plurality of data objects, the object storage system comprising:
    an ingest area configured for accumulating the volume of data, the ingest area being provided within a non-taped-based storage medium;
    a first tape medium that is configured such that a first subset of the plurality of data objects is copied to the first tape medium;
    a second tape medium that is configured such that a second subset of the plurality of data objects is copied to the second tape medium, the second tape medium being independent of the first tape medium; and
    an object storage software that is configured to manage the object storage system; the object storage software being configured to generate a first extent parity that contains redundant information from the first subset of the plurality of data objects, and write the first extent parity to the first tape medium.

11. The object storage system of claim 10 wherein the ingest area is provided within one of a hard-disk drive-based storage medium, a solid-state drive-based storage medium, a non-volatile memory express-based storage medium, and a battery-backed random-access memory-based storage medium.

12. The object storage system of claim 10 wherein the object storage software is further configured to generate a second extent parity that contains redundant information from the second subset of the plurality of data objects, and write the second extent parity to the second tape medium.

13. The object storage system of claim 12 wherein the object storage software uses erasure coding to generate the first extent parity and the second extent parity.

14. The object storage system of claim 12 wherein the object storage software is further configured to generate a volume parity that contains redundant information from the volume of data, and write the volume parity to a third tape medium that is independent of the first tape medium and the second tape medium.

15. The object storage system of claim 14 wherein the first tape medium is retained within a first tape library; wherein the second tape medium is retained within a second tape library that is different than the first tape library; and wherein the third tape medium is retained within a third tape library that is different than the first tape library and the second tape library.

16. The object storage system of claim 10 further comprising a third tape medium that is configured such that a third subset of the plurality of data objects is copied to the third tape medium, the third tape medium being independent of the first tape medium and the second tape medium.

17. The object storage system of claim 16 wherein the object storage software is configured to generate a second extent parity that contains redundant information from the second subset of the plurality of data objects, write the second extent parity to the second tape medium, generate a third extent parity that contains redundant information from the third subset of the plurality of data objects, and write the third extent parity to the third tape medium.

18. The object storage system of claim 17 wherein the object storage software is further configured to generate a first volume parity that contains redundant information from the volume of data, write the first volume parity to a fourth tape medium that is independent of the first tape medium, the second tape medium and the third tape medium, generate a second volume parity that contains redundant information from the volume of data, and write the second volume parity to a fifth tape medium that is independent of the first tape medium, the second tape medium, the third tape medium and the fourth tape medium.

\* \* \* \* \*